United States Patent [19]

Ulichney

[11] Patent Number: 4,955,065
[45] Date of Patent: Sep. 4, 1990

[54] SYSTEM FOR PRODUCING DITHERED IMAGES FROM CONTINUOUS-TONE IMAGE DATA

[75] Inventor: Robert A. Ulichney, Cambridge, Mass.

[73] Assignee: Digital Equipment Corporation, Maynard, Mass.

[21] Appl. No.: 441,331

[22] Filed: Oct. 10, 1989

Related U.S. Application Data

[63] Continuation of Ser. No. 26,588, Mar. 17, 1987, abandoned.

[51] Int. Cl.$^5$ ............................................. G06K 9/38
[52] U.S. Cl. ...................................... 382/50; 358/456
[58] Field of Search .......................... 382/50, 56, 57; 358/283

[56] References Cited

U.S. PATENT DOCUMENTS

| 4,196,454 | 4/1980 | Warren | 358/283 |
| 4,339,774 | 7/1982 | Temple | 358/283 |
| 4,345,313 | 8/1982 | Knox | 358/283 |
| 4,449,150 | 5/1984 | Kato | 358/283 |
| 4,654,721 | 3/1987 | Goertzel et al. | 358/283 |
| 4,668,995 | 5/1987 | Chen et al. | 358/283 |

OTHER PUBLICATIONS

C. Billotet-Hoffman, O. Bryngdahl, "On The Error Diffusion Technique For Electronic Halftoning", *Proceedings of the S.I.D.*, vol. 24, No. 3, (1983), pp. 253–258.
W. Schreiber, "The Representation of Continuous Tone Images On Binary Recording Material", pp. 1–7, (11/24/81).
P. Stucki, "Mecca—A Multiple-Error Correction Computation Algorithm For Bi-Level Image Hardcopy Reproduction", *Research Report*, (1981), pp. 1–46.
J. Jarvis, C. Judice, W. Ninke, "A Survey of Techniques for the Display of Continuous Tone Pictures on Bilevel Displays", Computer Graphics and Image Processing, (1976), pp. 13–40.
Schreiber, "Coding of Half-Tone Pictures", (1977), pp. 1–4.
M. Schroeder, "Images from Computers", IEEE Spectrum, (1969), pp. 66–78.

*Primary Examiner*—Leo H. Boudreau
*Attorney, Agent, or Firm*—Fish & Richardson

[57] ABSTRACT

A digital image processing system for converting continuous tone pixel values representing an image into halftone or dithered pixel values, with the dithered pixel values representing each pixel having fewer bits than are used to represent each pixel in the continuous tone image. The continuous tone pixel for a line of pixels is loaded into an input buffer circuit having a plurality of storage locations, with each location storing the continous-tone values for one pixel. Iteratively, the pixel value from each location is modified by a perturbed weighted error value, and then quantized to form the output halftone or dithered pixel value. An error value is then determined which is used in processing of subsequent continuous tone pixel values. The processing of the continuous tone pixel values proceeds in a serpentine manner over the image, that is, processing of adjacent lines of the continuous tone pixel data proceeds in opposite directions.

16 Claims, 2 Drawing Sheets

INPUT BUFFER 11

OUTPUT BUFFER 15

ERROR BUFFER

SYSTEM FOR PRODUCING DITHERED IMAGES FROM CONTINUOUS-TONE IMAGE DATA

This is a continuation of copending application Ser. No. 07/026,588 filed on Mar. 17, 1987, now abandoned.

BACKGROUND OF THE INVENTION

1. Field of the Invention

The invention relates generally to the field of digital data processing systems, and more specifically to systems for processing bits representing digitized images to produce perceptually similar images with fewer bits than the original.

2. Description of the Prior Art

A problem in digital image processing is the vast amount of data, expressed in binary digits or "bits", which are used to describe a digital image. Digital images are defined in terms of picture elements, or "pixels", with each pixel being the smallest unit of an image which the data processing system can process and display. Depending on the size of the image and the resolution, a low-resolution two-dimensional rectangular image may have as few as several tens or a hundred pixels on a side, and some high-resolution images have as many as a thousand or more pixels on a side.

Depending on a number of factors, each pixel may also have as many as eight, sixteen or more bits of data in a "continuous-tone" image. In a monochrome image, the data associated with each pixel typically identifies a "luminance" level, which is a measure of the brightness of the pixel. In a color image, the data may also identify various color components and their relative brightness in the pixel. For example, in a some monochrome displays, each pixel may be black (a low luminance level) or white (a high luminance level), or it may have these plus a number of intermediate, or "gray", brightness levels. The luminance of a pixel is typically expressed as a binary encoded value, such that if, for example, eight bits are used to encode each pixel, the luminance of the pixel may have up to two hundred fifty six (that is, $2^8$) different gray levels, including the black and white extremes. If the image has several colors, bits must also be used to identify the color, and, perhaps, the relative brightness level of each color in the pixel.

While an image may be defined in terms of its "continuous-tone" image values, in which each pixel is defined by eight or more bits of data, display devices such as video display terminals and printers normally can only accommodate one or at most a few bits of data for each pixel to define the luminance of the displayed pixel. Images in which a pixel's luminance is defined by one bit per pixel are termed "halftone" images, while, more generally, images in which the pixel luminance is defined by one or only a few bits of data (but fewer bits than are required for the continuous tone image) are termed "dithered" images. The continuous tone image data is processed to generate the output luminance values for the pixels ("pixel values") to define the halftone or dithered image for the display device.

Several techniques have been developed to generate pixel values so that the image as rendered by the display device is perceptually similar to the actual image. One popular technique for producing halftone image data makes use of an "error diffusion" algorithm described in R.W. Floyd, et al., "An Adaptive Algorithm for Spatial Greyscale", Proceeding of the S.I.D., Vol. 17/2, Second Quarter, 1976. In that technique, the continuous-tone image is processed pixel by pixel to produce halftone output values for each pixel. The pixels are processed line by line from the top of the image to the bottom of the image. The processing takes place in a raster pattern, that is, from left to right in each line. In processing each pixel, a correction value, which is related to previous processing of pixels in the image, is added to the continuous tone value to produce a modified pixel value. Based on the modified pixel value, an output pixel value is then assigned one of two halftone values to indicate to the display device whether it should display the pixel as white or black in the halftone image.

After the processed pixel is assigned the halftone output value, an error value is determined between the output pixel value and the modified pixel value. The error value represents the difference between the selected halftone value assigned to the pixel and the actual modified pixel value. The error values are used in calculating the correction value for subsequently processed pixels. The correction value which is used in calculating the modified pixel value of each pixel is related to sum of error values of nearby previously processed pixels, which have been multiplied by various predetermined weighting values. The weighting values have been empirically selected to produce halftone images which are perceptually similar to the continuous-tone images.

The point of the error diffusion technique is that the error values, which, generally speaking, relate to the difference between the white and black luminances in the output halftone image and the gray pixel levels in the original continuous tone image, are diffused as processing proceeds to the right and downwardly in the image. Thus, while the halftone pixel value of any given pixel may be considerably different from the continuous-tone pixel level, over a group of pixels the error tends to even out so that the halftone image is perceptually similar to the continuous tone image.

While the error diffusion technique produces fairly good images, from a perceptual standpoint, it does have several problems. The primary problem is that it tends to produce undesirable artifacts, such as directional structures, in the halftoned image which are not present in the original continuous tone image. These artifacts are usually present in portions of an image which have large areas of constant or slowly-varying luminance. In addition, the technique tends to sharpen abrupt edges in a unidirectional manner.

SUMMARY OF THE INVENTION

The invention provides an improvement to the error diffusion technique, producing images which perceptually approximate the to continuous-tone images with fewer undesirable artifacts than are present in images produced by prior error diffusion techniques. In particular, the images produced by the new technique do not contain the directional structures which are present in the prior techniques, and thus provides dithered images which are more perceptually similar to the original continuous tone images than are available from prior techniques..

In brief, in the new error diffusion technique, processing is performed bidirectionally on the input continuous tone pixel image data in lines from top to bottom (as seen in the image), with the processing in adjacent lines being in opposite directions. That is, in one line, the continuous tone pixel image data is processed from left to right (as seen in the image), and in the next line the continuous tone pixel image data is processed from right to left (as seen in the image). For each pixel, a modified pixel value is formed from the continuous-tone pixel value and a correction value. The correction value that is used corresponds to the error values of nearby previously-processed pixels, each multiplied by a weighting value, with the weighting values varying within selected ranges to introduce a small perturbation. The modified pixel value is then quantized to form a halftoned or dithered output pixel value, and an error value is determined as between the modified pixel value and the quantized value for use in determination of the pixel values for subsequently processed pixels.

The bidirectional processing and the perturbation in the weighting values essentially eliminate any of the directional image structures that were present in halftoned images generated by prior error diffusion techniques. Thus, an image produced by the new image processing system more perceptually approximates the continuous-tone image with fewer disturbing artifacts than an image produced by the prior techniques.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
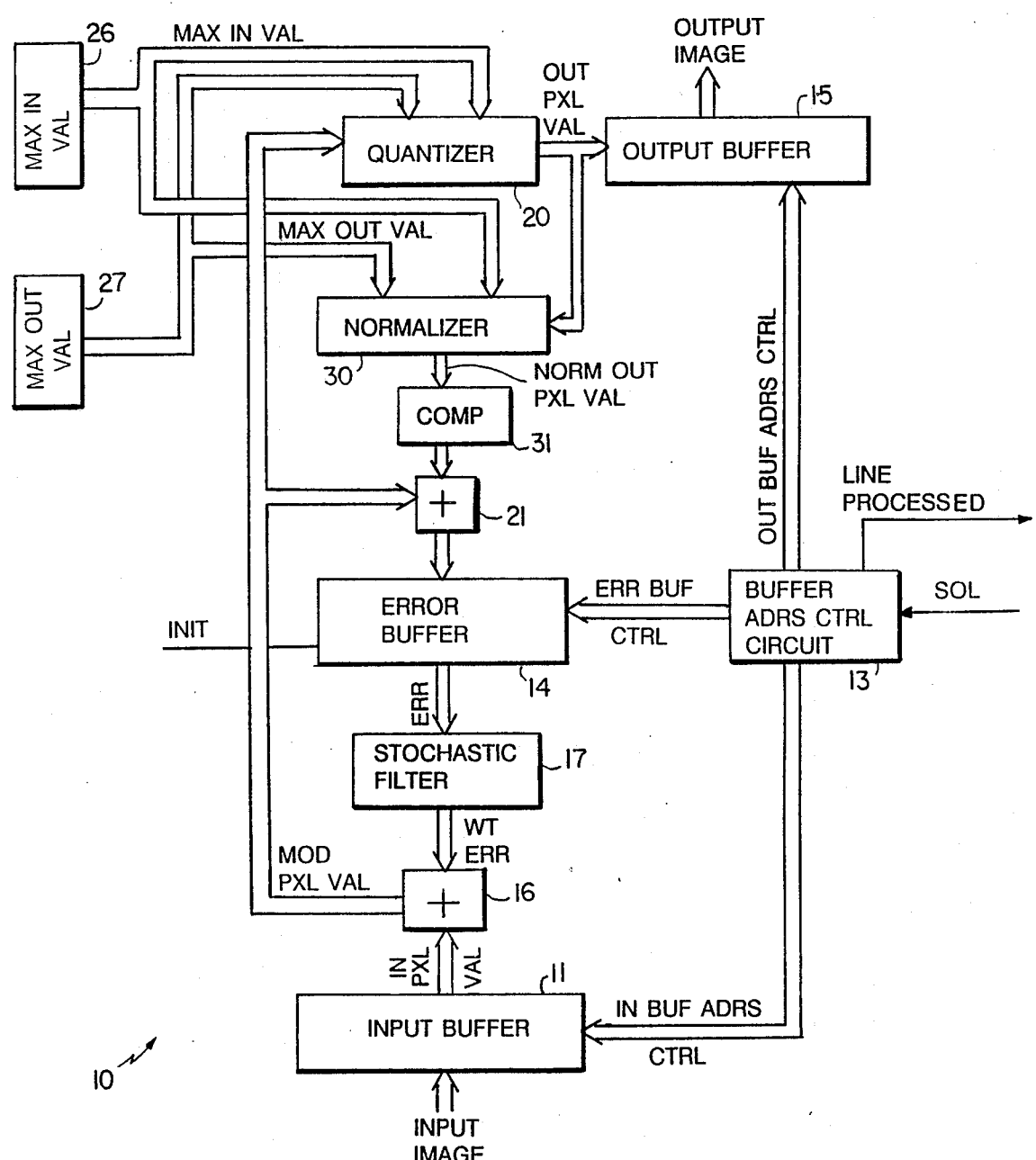
FIG. 1 is a block diagram of an image processing system according to the present invention.
Figure 2A:
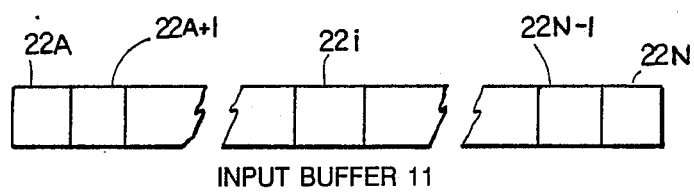
FIGS. 2A through 2C are diagrams of data structures represented in FIG. 1.

With reference to FIG. 1, an image processing system 10 in accordance with the invention includes an input buffer 11 which receives from an input source (not shown) luminance values ("pixel values") for a line of pixels in an image. The pixel values which are received in input buffer 11 are continuous tone values, and may include eight, sixteen or more bits of data per pixel. As depicted in FIG. 2A, the input buffer 11 includes "N" storage locations $22_A$ through $22_N$ for the "N" pixels in a line in the image, that is one storage location is provided per pixel. Storage location $22_A$ stores the continuous tone pixel value for the pixel at the left end of the line in the image and storage location $22_N$ stores the continuous tone pixel value for the pixel at the right end of the line. The storage locations between locations $22_A$ and $22_N$ store continuous tone pixel values for the pixels between the left end and the right end of the line, respectively.

Before or immediately after the input source has transferred the continuous tone pixel values for the first or uppermost line of pixels of an image into the input buffer, it asserts an INIT initialization signal which initializes an error buffer 14. Thereafter, after the input source has transferred the continuous tone pixel values for each line of pixels into the input buffer 11, it asserts an SOL start of line signal on a line 12. The SOL start of line signal is received by a buffer address control circuit 13, which is connected to and controls the input buffer 11, an error buffer 14, and an output buffer 15.

Figure 2B:
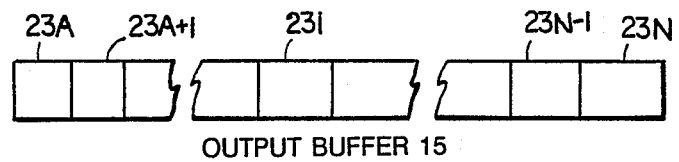

The output buffer 15 stores halftone or dithered pixel values for the pixels in the image line whose continuous-tone pixel values are present in input buffer 11. As depicted in FIG. 2B, the output buffer 15, like the input buffer 11, comprises a set of storage locations $23_A$ through $23_N$, with one storage location being provided for each pixel in the image line. Thus, each storage location $23_i$ in the output buffer 15 is associated with one storage location $22_i$ in the input buffer 11, that is, they both are related to the same pixel, the ith pixel, in the image line being processed by the system 10.

Figure 2C:
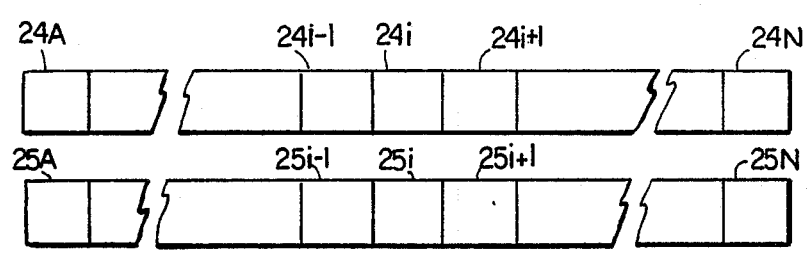

With reference to FIG. 2C, the error buffer contains two sets of storage locations $24_A$ through $24_N$ and $25_A$ through $25_N$, with each set having as many storage locations as the input buffer 11 or the output buffer 15. The error buffer stores, for each pixel, a value which is related to the difference between the halftone or dithered pixel value which system 10 determines for the pixel and a continuous-tone pixel value.

As explained below, the contents of the error buffer are used in determining the halftone or dithered pixel values for subsequently processed pixel image data. Immediately after initialization, the contents of the storage locations $24_A$ through $24_N$ and $25_A$ through $25_N$ are all zero. Thereafter, storage locations $24_A$ through $24_N$ store the error values for the previously processed line of pixels, which, during processing of the first line of pixels are all zero. The storage locations $25_A$ through $25_N$ store the error values for the current line of pixels, that is, the line whose continuous tone pixel values are currently in input buffer 11 and being processed by system 10. It will be appreciated that storage locations $25_A$ through $25_N$ may not be completely filled; they will have error values only so far as the pixels in the line have been processed by the system. As each storage location $22_i$ in input buffer 11 is processed, an error value is loaded into storage location $25_i$ in the error buffer 14.

When the SOL start of line signal is asserted, the buffer address control circuit 13 initiates processing on the pixel values that have been loaded into the input buffer 11. The buffer address control circuit 13 first selects a storage location $22_A$ or $22_N$ at one end (as depicted in FIG. 2A), and initiates processing on image data in that location. After each location is processed, the buffer address control circuit 13 steps to the next location in the input buffer 11, initiating processing on the pixel value at that location. This process continues until the pixel values in all of the storage locations $22_i$ have been processed, at which time the buffer address control circuit 13 asserts a LINE PROCESSED signal, which is received by downstream circuitry (not shown). At this point, the output buffer 15 contains halftone or dithered pixel values for the line in the image represented by the continuous tone pixel values in input buffer 11. In response to the LINE PROCESSED signal, the downstream circuitry may retrieve the contents of the output buffer 15 for display.

As has been described, the buffer address control circuit may begin processing the image data in input buffer 11 from the left most storage location $22_a$ or the right most storage location $22_N$. If, in processing one line, the buffer address control circuit 13 begins processing from the left most storage location $22_A$, in processing the next line it begins processing from the right most storage location $22_N$. In both cases, the buffer address control circuit 13 enables processing of the contents of the storage locations to the other end, that is, storage locations $22_N$ or $22_A$, respectively. Thus, processing over the image data representing the lines of an image proceeds in a "serpentine" manner.

It will be appreciated that, if the buffer address control circuit 13 enables processing of pixel values from left to right, that is, from storage location $22_A$ to storage location $22_N$ in the input buffer 11, it also enables output pixel values to be stored in the output buffer 15 from left to right, that is, from storage location $23_A$ to storage location $23_N$. Similarly, if the control circuit enables processing of pixel values from right to left, that is, from storage location $22_N$ to storage location $22_A$ in the input buffer, it also enables output pixel values to be stored in the output buffer 15 from right to left, that is, from storage location $23_N$ to storage location $22_A$. In addition, the particular storage locations $24_A$ through $24_N$ and $25_A$ through $25_N$ in error buffer 14 selected by the buffer address control circuit 13 depends on the direction in which the storage locations $22_A$ through $22_N$ in input buffer 11 are being processed.

To select a storage location $22_i$ in the input buffer 11, the buffer address control circuit 13 generates an INP BUF ADRS CTRL input buffer address control signal which identify the storage location. In response, the input buffer 11 transmits its contents as an IN PXL VAL input pixel value to one input of an adder 16.

Contemporaneously, the buffer address control circuit 13 transmits an ERR BUF CTRL error buffer control signal to the error buffer 14 to enable it to transmit error values from selected locations to a stochastic filter 17. In one embodiment, if the INP BUF ADRS CTRL input buffer address control signal identifies location $22_i$ in input buffer 11, the ERR BUF CTRL error buffer control signals identify locations $24_{i-1}$ through $24_{i+1}$, which contain error values from the previously processed pixel line, and either location $25_{i-1}$ or location $25_{i-1}$, which contain error values from the currently processed pixel line. If buffer address control circuit 13 began processing from the left most end of input buffer 11, and is stepping to the right, the ERR BUF CTRL error buffer control signal identifies storage location $25_{i-1}$.

On the other hand, if buffer address control circuit 13 began processing from the right most end of input buffer !1, and is stepping to the left, the ERR BUF CTRL error buffer control signals identify storage location $25_{i+1}$.

The stochastic filter 17 receives all of the error values from locations in the error buffer 14 identified by the ERR BUF CTRL error buffer control signals, multiplies each of them by a weighting value, forms a sum of the products and transmits the result as an ERR error value to a second input of adder 16. Adder 16 then forms a sum which is a MOD PXL VAL modified pixel value for the pixel.

The MOD PXL VAL modified pixel value output from adder 16 is coupled to a quantizer 20 and one input of a second adder 21. The quantizer 20 receives the MOD PXL VAL modified pixel value and, based on that value, a MAX IN VAL maximum input value stored in a register 26 and a MAX OUT VAL maximum output value stored in a register 27, produces an OUT PXL VAL output pixel value which is stored in a storage location $23_i$ in the output buffer 15 corresponding to the storage location in the input buffer 11 being processed. The quantizer 20, based on the MAX OUT VAL maximum output value and MAX IN VAL maximum input value, establishes a range of modified pixel values to be assigned to each output pixel value. When it receives a MOD PXL VAL modified pixel value from the adder 16, it determines the corresponding range and transmits the associated OUT PXL VAL output pixel value.

The particular correspondence produced by the quantizer 20 between the MOD PX VAL modified pixel value and the MAX IN VAL maximum input value and MAX OUT VAL maximum output value may be illustrated by several examples. In one example, the system 10 may receive input continuous tone pixel values having eight bits and produce output pixel values having one bit (thereby producing a "halftone" image). The input pixel values define two hundred and fifty six brightness levels from "0" through "255", with "0" representing black, "255" representing white, and "1" through "254" representing shades of gray between black and white. The output pixel values define two output pixel values "0" and "1", with "0" representing black and "1" representing white. The MAX IN VAL maximum input value corresponds to "255" and the MAX OUT VAL maximum output value corresponds to "1".

In that example, the quantizer 20 establishes two modified pixel ranges nominally centered around "0" and "255", with each range being associated with one of the two output pixel values. The difference between the nominal centers corresponds to the MAX IN VAL "255" divided by the MAX OUT VAL "1" (that is "255"), and the end points of the ranges is halfway between the respective nominal centers. Thus, the quantizer establishes a correspondence as follows:

| MOD PXL VAL | OUT PXL VAL | NOM. CENTER |
|---|---|---|
| 127.5 and below | 0 | 0 |
| Above 127.5 | 1 | 255 |

(Where "NOM. CENTER" indicates the nominal center of the respective ranges.) Thus, if the quantizer 20 receives a MOD PXL VAL modified pixel value of "127.5" or below, it transmits an OUT PXL VAL output pixel value "0", and if it receives a MOD PXL VAL modified pixel value above "127.5", it transmits an OUT PXL VAL output pixel value of "1".

In another example, system 10 may receive the same continuous tone input pixel values and produce a dithered image defined by output pixel values having two bits. The two output bits define four output pixel levels, with "0" and "3" representing black and white respectively, and "1" and "2" representing two shades of gray. The quantizer establishes four modified pixel ranges nominally centered around modified pixel values "0", "85", "170" and "255" each associated with one of the four output pixel values. The differences between the nominal centers corresponds to the MAX IN VAL "255" divided by the MAX OUT VAL "3" (that is "85"). Thus, the quantizer establishes a correspondence as follows:

| MOD PXL VAL | OUT PXL VAL | NOM. CENTER |
|---|---|---|
| 42.5 and below | 0 | 0 |
| Above 42.5 to 127.5 | 1 | 85 |
| Above 127.5 to 212.5 | 2 | 170 |
| Above 212.5 | 3 | 255 |

The OUT PXL VAL output pixel value produced by the quantizer 20 is stored in the ith storage location in the output buffer 15. The buffer address control circuit 13 produces OUT BUF ADRS CTRL output buffer address control signals which identify that location.

The OUT PXL VAL output pixel value from quantizer 20 is also transmitted, along with the MAX IN VAL maximum input value from register 26 and MAX OUT VAL maximum output value from register 27 to a normalizer 30. The normalizer 30 produces a NORM OUT PXL VAL normalized output pixel value by dividing the MAX IN VAL maximum input value by the MA OUT VAL maximum output value and multiplying the result by the OUT PXL VAL output pixel value. Essentially, the NORM OUT PXL VAL normalized output pixel value produced by the normalizer 30 corresponds to the nominal center of the range used by the quantizer 20 which is associated with the OUT PXL VALUE output pixel value.

The NORM OUT PXL VAL normalized output pixel value produced by the normalizer 30 is negated in a complement circuit and coupled to the second input of adder 21. The output of adder 21, a PXL ERR pixel error value, corresponds to the difference between the nominal center value produced by the normalizer 30 and the MOD PXL VAL modified pixel value produced by adder 16. The PXL ERR pixel error value is coupled to the error buffer for storage in the storage location $25_i$ associated with the input buffer location $22_i$ being processed.

After the output of the adder 21 is stored in the appropriate storage location $25_i$ in the error buffer 14, the next pixel may be processed, that is, the pixel whose continuous-tone value is stored in storage location $22_{i+1}$ or $22_{i-1}$, depending on the direction in which the line of pixels whose pixel values are stored in input buffer 11 is being processed.

The system 10 performs the above-described operation on each of the storage locations $22_A$ through $22_N$ in input buffer 11. As noted above, after the entire line of pixels has been processed, the buffer address control circuit 13 asserts the LINE PROCESSED signal, which is received by external circuitry (not shown). At that point the external circuitry may remove the contents of output buffer 15 and insert continuous tone pixel values for a new line of pixels in input buffer 11. The buffer address control circuit 10 also enables the contents of storage locations $25_A$ through $25_N$ (FIG. 2C) in the error buffer 14 to be shifted into locations $24_A$ through $24_N$, which may be accomplished either by a physical shifting as between the two sets of storage locations, or by adjusting pointers which identify the two sets of storage locations. The system 10 is then ready to process another line of pixel image data.

As has been described above, the stochastic filter produces a sum of the products of the contents of selected locations in error buffer 14, multiplied by several weighting values. In stochastic filter 17, the weighting values are as follows:

$w_1 = 7/16 + b$
$w_2 = 1/16 + a$
$w_3 = 5/16 - b$
$w_4 = 3/16 - a$ where a and b are perturbation values selected at random or each of the pixels, with $-1/32 < a < 1/32$ $-1/8 < b < 1/8$.

The nominal weighting values (that is, the values without the perturbations) and the ranges of the perturbation values are empirically determined values which provide perceptual similarity of a dithered image to the continuous tone image. The perturbation values are selected in a random or pseudo-random manner for each pixel being processed.

Based on these weighting values, the stochastic filter 17 performs the following calculation on the ERR error values provided by the error buffer 14:

$w_1[25_{i-1}9 + w_2[24_{i-1}] + w_3[24_i] + w_4[24_{i+1}]$ when the buffer address control circuit 13 is stepping left to right (as depicted in FIG. 2A) from storage location $22_A$ to $22_N$, and:

$w_1[25_{i+1}] + w_2[24_{i+1}] + w_3[24_i] + w_4[24_{i-1}]$ when the buffer address control circuit 13 is stepping left to right (as depicted in FIG. 2A) from storage location $22_N$ to $22_A$ where the bracketed numbers indicate the contents of the respective storage locations in the error buffer 14.

It will be appreciated that the sum of the weighting values $w_i$ through $w_4$ is equal to "1", and that the weighting values are applied to the errors calculated during processing of the next adjacent pixel in the same line, and the three nearest pixels in the next previous line in the image. The two largest nominal weights, namely 7/16 and 5/16, are applied to the error values associated with the directly adjacent pixels, that is, in locations $24_{i-1}$ (or $24_{i+1}$) and $25_i$, respectively. The two smaller nominal weights, namely 3/16 and 1/16 are applied to the weights associated with the two other nearby pixels, that is, the pixels which are diagonally adjacent to the pixel associated with storage location $22_i$.

The "b" perturbation value is used for the directly adjacent pixels, and the "a" perturbation value is used for the diagonally adjacent pixels. The maximum values for the random perturbation are empirically selected to be approximately one-half of the smaller of each of the pairs of weighting values; that is, the maximum value for the "b" perturbation, that is, ⅛, is approximately one-half of 5/16, the smaller of the nominal weighting values to which the "b" perturbation is applied. Similarly, the maximum value for the "a" perturbation, that is, 1/32, is one-half of 1/16, the smaller of the nominal weighting values to which the "a" perturbation is applied. The maximum value for the "b" perturbation, namely ⅛, is actually somewhat smaller than one-half of 5/16, is selected to simplify binary arithmetic involving the perturbation.

By perturbing the weighting values used by the stochastic filter 17, and by having the buffer address control circuit 13 enable the scanning of the pixel values in the input buffer 11 in a serpentine manner, the system 10 avoids the undesirable artifacts such as the directional constructs and the unidirectional sharpening of abrupt edges which are present in the halftone images that are produced by prior processing systems, particularly in prior error diffusion systems. Thus, dithered images that are produced by the system 10 are more perceptually approximate the continuous tone images than do prior systems, most notably the prior error diffusion systems.

It will be appreciated that the system depicted in FIG. 1 may be adapted to processes color images as well as monochrome images. In particular, a color image may be taken as, generally, three monochrome images, with each monochrome image representing one of three primary colors defining the color image. The composite of the three monochrome images thus represents the original color image. Each of the three monochrome images may be separately and independently processed by the system depicted in FIG. 1 to produce a color halftone or dithered image, with the color halftone image having one bit for each primary color, and the color dithered image having only a few bits for each primary color.

It will also be appreciated that, if the modified pixel values or output pixel values have a minimum value other than zero, the quantizer 30 and normalizer 30 will also be provided with the respective minimum values, and will perform appropriate scaling and adjustment of the ranges and nominal centers in response thereto as will be apparent to those skilled in the art.

The foregoing description has been limited to a specific embodiment of this invention. It will be apparent, however, that variations and modifications may be made to the invention, with the attainment of some or all of the advantages of the invention. For example, it will be appreciated that the invention may be embodied in either hardware or software in a suitably programmed digital data processing system, both of which are readily accomplished by those of ordinary skill in the respective arts. Therefore, it is the object of the appended claims to cover all such variations and modifications as come within the true spirit and scope of the invention.

What is claimed as new and desired to be secured by Letters Patent of the United States is:

1. An image processing system for processing continuous tone pixel image values from a data source representing an image, the image being represented by a plurality of lines of pixels, with each line including a plurality of pixels, to produce output pixel values, said data source iteratively presenting to said system continuous tone pixel image values associated with each pixel, said system comprising:
    A. error means for storing error values associated with a plurality of previously-processed pixels;
    B. modification means for connection to said data source and connected to said error means for generating modified pixel values in response to the continuous tone pixel values and weighted error values associated with proximate previously processed pixels, each error value being weighted by a weight comprising a predetermined value dependent on the position of the corresponding previously processed pixel relative to the position of the currently processed pixel, said weight also comprising a relatively small perturbation value which varies from one currently processed pixel to another currently processed pixel;
    c. quantization means connected to said modification means for receiving the modified pixel values and for generating, in response thereto, output pixel values; and
    D. error generation means connected to said quantization means, said error means and said modification means for generating, in response to the modified pixel values and said output pixel values, an error value for the pixel for storage in said error means.

2. A system as defined in claim 1 further comprising:
    A. input means connected to said data source including a plurality of storage locations for receiving continuous tone pixel values associated with a line of pixels;
    B. output means connected to said quantization means comprising a plurality of storage locations for receiving output pixel values for a line of pixels; and
    c. control means connected to said input means, said output means and said error means for controlling said input means and said error means to iteratively couple contents of selected storage locations to said modification means and for controlling said output means to receive and store the output of said quantization means, the control means enabling the input means to iteratively transmit the contents of its storage means in alternating directions along respective alternate lines of pixel values.

3. An image processing system as defined in claim 1 wherein said modification means includes:
    A. perturbation means for generating perturbation values;
    B. weighting means connected to said perturbation means and said error means for generating in response to said perturbation values and said error values a correction value; and
    C. modified pixel value generation means connected to said weighting means and for connection to said data source for generating said modified pixel values in response to said correction value and said continuous tone pixel values.

4. An image processing system as defined in claim 1 further including maximum input value identification means for identifying a maximum input value and a maximum output value identification means for identifying a maximum output value, said quantization means including correspondence means for establishing a plurality of ranges of correspondence between the modified pixel values and each output pixel value and output value means for establishing an output pixel value in response to a received modified pixel value and the ranges established by said correspondence means.

5. An image processing system as defined in claim 4 wherein said error generation means includes normalization means connected to said quantization means, said maximum output value identification means and said maximum input value identification means for generating, in response to each output pixel value received from said quantization means, a nominal center value based on said maximum input value, said maximum output value and said output pixel value, and error means for determining the difference between said nominal center value and said modified pixel value, said difference constituting said error value.

6. An image processing system for processing continuous tone pixel image values from a data source representing an image, the image being represented by a plurality of lines of pixels, with each line including a plurality of pixels, to produce halftone pixel image data, said data source iteratively presenting to said system continuous tone pixel image data associated with each pixel, said system comprising:
    A. input means connected to said data source including a plurality of locations for receiving continuous tone pixel image data associated with a line of pixels;

B. correction means connected to said input means for receiving error values associated with proximate previously processed pixels and for generating modified pixel image data in response to the continuous tone pixel image data and weighted error values associated with proximate previously processed pixels, each error value being weighted by a weight comprising a predetermined value dependent on the position of the corresponding previously processed pixel relative to the position of the currently processed pixel, said weight also comprising a relatively small perturbation value which varies from one currently processed pixel to another currently processed pixel;

C. quantization means connected to said correction means for receiving the modified pixel image data and for generating, in response thereto, halftone image pixel data;

D. error means connected to said quantization means, said error means and said correction means for generating error values in response to the modified pixel image data and said halftone image pixel data; and E. control means connected to said input means and said error means for controlling said input means and said error means to iteratively couple contents of selected storage locations to said correction means, the control means enabling the input means to iteratively transmit the contents of its storage locations in alternating directions along respective alternate lines of pixel image data.

7. An image processing system as defined in claim 6 further comprising output means connected to said quantization means and said control means and comprising a plurality of storage locations each for receiving and storing the halftone pixel image data from said quantization means in response to a control signal from said control means.

8. An image processing system as defined in claim 6 wherein said correction means includes:

A. perturbation means for generating perturbation values;

B. weighting means connected to said perturbation means and said error means for generating in response to said perturbation values and said error values a correction value; and C. modified pixel image data generation means connected to said weighting means and said input means for generating said modified pixel image data in response to said correction value and said continuous tone pixel image data.

9. An image processing system as defined in claim 6 further including maximum input value identification means for identifying a maximum input value and a maximum output value identification means for identifying a maximum output value, said quantization means including correspondence means for establishing a plurality of ranges of correspondence between the modified pixel values and each output pixel value and output value means for establishing an output pixel value in response to a received modified pixel value and the ranges established by said correspondence means.

10. An image processing system as defined in claim 9 wherein said error generation means includes normalization means connected to said quantization means, said maximum output value identification means and said maximum input value identification means for generating, in response to each output pixel value received from said quantization means, a nominal center value based on said maximum input value, said maximum output value and said output pixel value, and error means for determining the difference between said nominal center value and said modified pixel value, said difference constituting said error value.

11. An image processing system for processing continuous tone pixel image data from a data source representing an image, the image being represented by a plurality of lines of pixels, with each line including a plurality of pixels, to produce halftone pixel image data, said data source iteratively presenting to said system continuous tone pixel image data associated with each pixel, said system comprising:

A. an input line buffer connected to said data source including a plurality of input storage locations each for receiving and storing continuous tone pixel image data associated with a line of pixels;

B. an output line buffer including a plurality of output storage locations, including one output storage location for each pixel in a line;

C. an error value storage buffer including a current error storage buffer and a previous error storage buffer each including a plurality of storage locations for storing error values, each of said storage locations in said current error storage buffer and said previous error storage buffer being associated with a pixel in a line in an image, the storage locations of said current error storage buffer storing error values associated with a current line of pixels and the storage locations of the previous error storage buffer storing error values associated with a previous line of pixels;

D. correction means for receiving continuous tone pixel image data from a selected location of said input line buffer and error values from selected current error value storage locations and previous error value storage locations of said error value storage buffer for generating modified pixel image data in response to the continuous tone pixel image data and weighted error values associated with proximate previously processed pixels, each error value being weighted by a weight comprising a predetermined value dependent on the position of the corresponding previously processed pixel relative to the position of the currently processed pixel, said weight also comprising a relatively small perturbation value which varies from one currently processed pixel to another currently processed pixel;

E. quantization means for generating halftone image pixel data in response to said modified pixel image data from said correction means for storage in a selected output storage location in said output line buffer;

F. error value generation means for generating error values in response to the modified pixel image data and said halftone image pixel data; and G. control means for:

(i) enabling said input line buffer to iteratively couple to said correction means the contents of input storage locations representing the continuous tone pixel image data for a pixel, the control means enabling the input means to transmit the contents of its storage locations in alternating directions along alternate lines of pixel image data;

(ii) enabling, during each iteration:
  (a) said error value storage buffer to couple to said correction means the contents of current error storage locations and previous error storage locations associated with selected pixels proximate the pixel whose continuous tone pixel image data is being transmitted.
  (b) said output means to receive and store the output of said quantization means in an output storage location associated with the pixel whose continuous tone pixel image data is being transmitted, and
  (c) said error value storage buffer to store, in a current error value storage location associated with the pixel whose continuous tone pixel image data is being transmitted, the error value generated by said error value generation means.

12. A method of iteratively processing continuous tone pixel image values representing an image, the image being represented by a plurality of lines of pixels, with each line including a plurality of pixels, to produce output pixel values, comprising the steps, during each iteration, of:
  A. generating a modified pixel value in response to the continuous tone pixel image value and weighted error values associated with previously processed pixels, each error value being weighted by a weight comprising a predetermined value dependent on the position of the corresponding previously processed pixel relative to the position of the currently processed pixel, said weight also comprising a relatively small perturbation value which varies from one currently processed pixel to another currently processed pixel;
  B. quantizing said modified pixel value to produce an output pixel value; and
  C. generating an error value in response to said output pixel value and said modified pixel value for use during subsequent iterations, 13. A method of iteratively processing continuous tone pixel image values representing an image, the image being represented by a plurality of lines of pixels, with each line including a plurality of pixels, to produce output pixel values, comprising the steps of:
  A. loading continuous tone pixel image values associated with a line of pixels into respective storage locations in an input buffer;
  B. iteratively processing pixels by performing the following steps:
    (i) selecting a storage location in said input buffer associated with said pixel and generating a modified pixel image value in response to the continuous tone pixel image data from said selected storage location and weighted error value associated with proximate previously processed pixels, each error value being weighted by a weight comprising a predetermined value dependent on the position of the corresponding previously processed pixel relative to the position of the currently processed pixel, said weight also comprising a relatively small perturbation value which varies from one currently processed pixel to another currently processed pixel, the input buffer storage locations during succeeding iterations in connection with a line of pixels being selected so that processing proceeds sequentially through said input buffer, and processing of alternate lines of said pixels proceeds in alternate directions through said input buffer;
    (ii) quantizing the modified pixel image data to produce an output pixel value;
    (iii) generating error values, for storage in an error value storage location in an error buffer associated with the input buffer storage location for use during subsequent iterations in response to the modified pixel image data and said output pixel value.

14. A method of iteratively processing continuous tone pixel image values representing an image, the image being represented by a plurality of lines of pixels, with each line including a plurality of pixels, to produce output pixel values, comprising the steps of:
  A. loading continuous tone pixel image values associated with a line of pixels into respective storage locations in an input buffer;
  B. iteratively processing pixels by performing the following steps:
    (i) selecting a storage location in said input buffer associated with said pixel and generating a modified pixel image value in response to the continuous tone pixel image data from said selected storage location and weighted error values associated with proximate previously processed pixels, each error value being weighted by a weight comprising a predetermined value dependent on the position of the corresponding previously processed pixel relative to the position of the currently processed pixel, said weight also comprising a relatively small perturbation value which varies from one currently processed pixel to another currently processed pixel, the input buffer storage locations during succeeding iterations in connection with a line of pixels being selected so that processing proceeds sequentially through said input buffer, and processing of alternate lines of said pixels proceeds in alternate directions through said input buffer;
    (ii) quantizing the modified pixel image data to produce an output pixel value;
    (iii) generating error values, for storage in an error value storage location in an error buffer associated with the input buffer storage location for use during subsequent iterations in response to the modified pixel image data and said output pixel value.

15. The image processing system of claim 1, 6, or 11 wherein said perturbation value varies randomly.

16. The method of claim 12, 13, or 14 wherein said perturbation value varies randomly.

* * * * *